United States Patent
Patil et al.

(10) Patent No.: US 11,190,521 B2
(45) Date of Patent: Nov. 30, 2021

(54) TLS POLICY ENFORCEMENT AT A TUNNEL GATEWAY

(71) Applicant: VMWARE, INC., Palo Alto, CA (US)

(72) Inventors: Sanjay Patil, Atlanta, GA (US); Craig Farley Newell, Atlanta, GA (US); Leung Tao Kwok, Beitou Dist. (TW); Amit Kumar Yadav, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 288 days.

(21) Appl. No.: 16/384,968

(22) Filed: Apr. 16, 2019

(65) Prior Publication Data
US 2020/0236114 A1 Jul. 23, 2020

(30) Foreign Application Priority Data
Jan. 18, 2019 (IN) .............................. 201941002281

(51) Int. Cl.
*H04L 29/06* (2006.01)
*G06F 21/31* (2013.01)

(52) U.S. Cl.
CPC ............ *H04L 63/102* (2013.01); *G06F 21/31* (2013.01); *H04L 63/029* (2013.01); *H04L 63/0272* (2013.01); *H04L 63/166* (2013.01); *H04L 63/101* (2013.01); *H04L 63/104* (2013.01)

(58) Field of Classification Search
CPC . H04L 63/102; H04L 63/0272; H04L 63/029; H04L 63/166; H04L 63/101; H04L 63/104; H04L 63/0428; H04L 63/0823; G06F 21/31
See application file for complete search history.

(56) References Cited

U.S. PATENT DOCUMENTS

| | | | |
|---|---|---|---|
| 9,419,942 B1* | 8/2016 | Buruganahalli | .... H04L 63/0236 |
| 9,571,465 B1* | 2/2017 | Mehr | .................. H04L 63/1433 |
| 10,382,401 B1* | 8/2019 | Lee | .......................... H04L 67/10 |
| 10,505,985 B1* | 12/2019 | Walter | ................ H04L 63/0236 |
| 2006/0294366 A1* | 12/2006 | Nadalin | ................ H04L 9/3265 |
| | | | 713/156 |
| 2016/0087941 A1* | 3/2016 | Mudigonda | ........... H04L 61/303 |
| | | | 726/12 |
| 2016/0219018 A1* | 7/2016 | Raman | ................... H04L 63/101 |
| 2016/0315912 A1* | 10/2016 | Mayya | ................ H04L 63/0281 |
| 2017/0078328 A1* | 3/2017 | McGinnity | ............. H04L 63/04 |
| 2017/0230334 A1* | 8/2017 | Newell | ................... H04W 12/03 |
| 2017/0289137 A1* | 10/2017 | Pendarakis | ......... H04L 63/0823 |
| 2017/0346853 A1* | 11/2017 | Wyatt | .................... H04L 9/3265 |
| 2019/0052482 A1* | 2/2019 | Yang | ................... H04L 63/0428 |
| 2019/0098016 A1* | 3/2019 | Jeon | .................... H04L 63/0428 |
| 2019/0215308 A1* | 7/2019 | Feyzibehnagh | ..... H04L 63/0428 |
| 2019/0230125 A1* | 7/2019 | Lee | ......................... H04L 63/164 |
| 2019/0306166 A1* | 10/2019 | Konda | ................ H04L 63/0428 |
| 2020/0169584 A1* | 5/2020 | Penner | .................. H04L 63/105 |
| 2020/0177630 A1* | 6/2020 | Penner | ................ H04L 63/0227 |
| 2020/0213206 A1* | 7/2020 | Bracken | ................ H04L 43/028 |
| 2020/0280584 A1* | 9/2020 | Zhao | .................... H04L 63/1408 |
| 2020/0322332 A1* | 10/2020 | Haque | .................... H04L 9/321 |

* cited by examiner

Primary Examiner — Sarah Su
(74) *Attorney, Agent, or Firm* — Thomas | Horstemeyer LLP

(57) ABSTRACT

Disclosed are various approaches for verifying the compliance of a TLS session with TLs policies. Traffic between an application and a destination server can be routed through a TLS gateway. The TLS gateway can inspect TLS handshake messages for compliance with TLS policies.

20 Claims, 4 Drawing Sheets

TLS POLICY ENFORCEMENT AT A TUNNEL GATEWAY

RELATED APPLICATIONS

Benefit is claimed under 35 U.S.C. 119(a)-(d) to Foreign Application Serial No. 201941002281 filed in India entitled "TLS POLICY ENFORCEMENT AT A TUNNEL GATEWAY", on Jan. 18, 2019, by VMWARE, INC., which is herein incorporated in its entirety by reference for all purposes.

BACKGROUND

Enterprises often deploy applications to user client devices such as smartphones. Client devices can be managed by a management service that provides the ability to remotely manage or administer client devices that are enrolled with the management service as a managed device. For example, devices that are running a variant of the iOS™ or Android™ operating systems can be enrolled with a remotely executed management service using application programming interfaces (APIs) or other capabilities that are embedded within the operating system of the device. A management component can also be installed on a client device so the device can be locally managed by the management component and remotely managed by the management service. An administrator can define policies or profiles that are associated with a particular client device through the management service, which can transmit the policies or profiles to the client device. The management component on the client device can install or enforce the policies or profiles on the client device. Additionally, the management service can issue commands to the management component to take certain actions on the client device.

The management service can allow an administrator to deploy certain applications onto managed devices. Applications can include third party applications such as productivity applications, messaging applications or other applications. An administrator can associate applications on the device with per-application virtual private network profiles, or per-app VPN profiles. By associating an application with a per-app VPN profile, an administrator can force some or all network traffic from the application to be routed through a VPN connection. The VPN connection can travel over an encrypted VPN tunnel to a tunnel gateway, which can in turn route the traffic to its destination. A destination server, in some cases, might be located on a network that is not ordinarily accessible by nodes outside the network other than through the tunnel gateway.

Transport layer security (TLS) is often employed to secure communications between an application and a destination server. Applications should follow best practices in terms of negotiating a TLS session with a destination server, as should users. For example, a user of an email client might be presented with the option to override or use an insecure network connection when a proper TLS session cannot be negotiated between the email client and a destination server. Users of certain application might grant access to the insecure network connection without considering the risk of whether the destination server is actually an attacker or a man-in-the-middle attack. In this example, by granting permission to the email client to use the insecure connection, the user might have unwittingly provided their email username and password to an attacker.

Additionally, it is impractical for an administrator to verify whether applications installed on user's devices utilize TLS best practices because the administrator might not have access to the source code or TLS implementations of each application.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
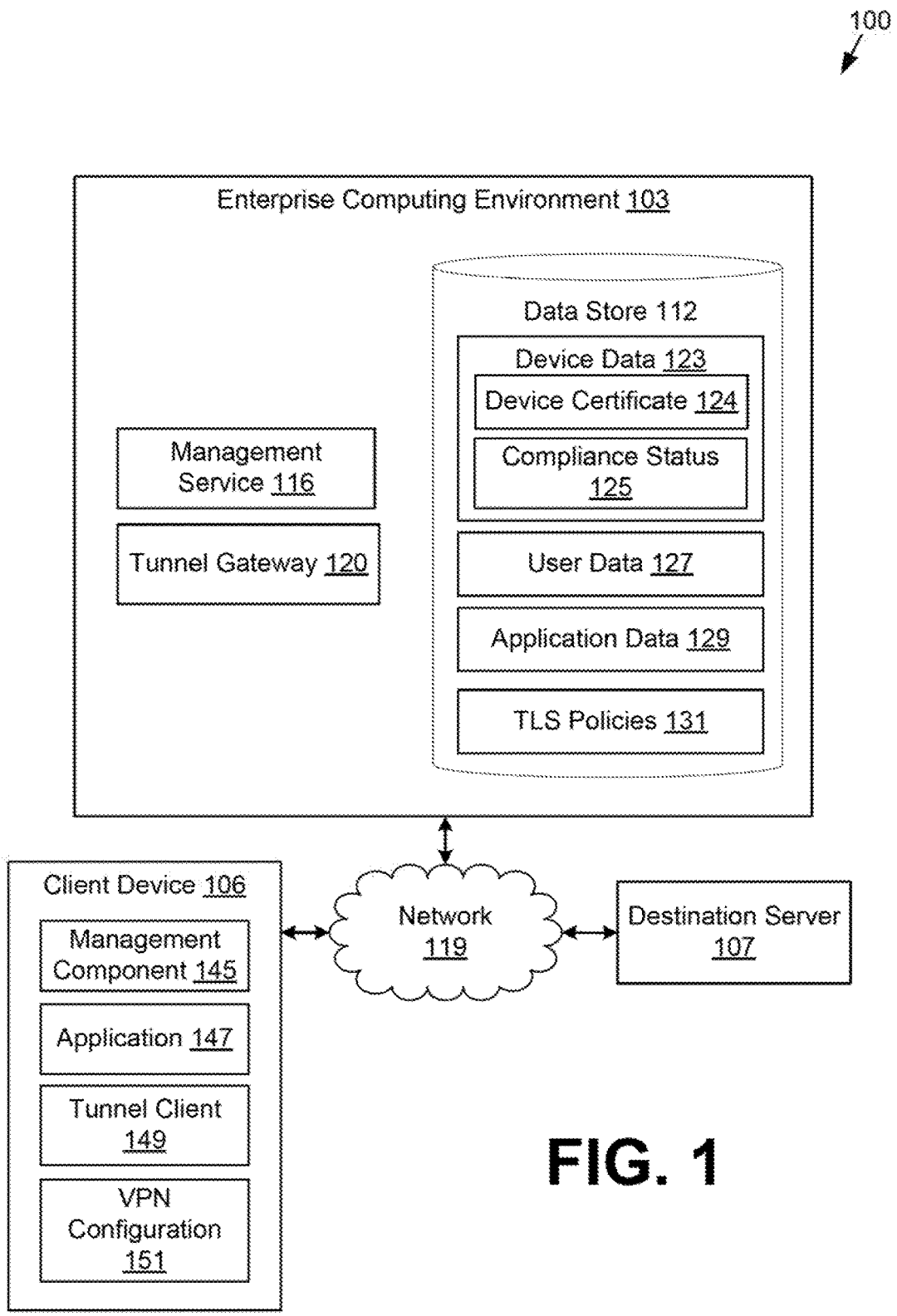
FIG. 1 is a schematic block diagram depicting an example implementation according to various examples of the disclosure.

Disclosed are examples of a virtual private network (VPN) tunnel gateway that can enforce policies on transport layer security (TLS) connections between an application on a client device and a destination server with which the application is attempting to communicate. Various operating systems, such as iOS®, Android®, and Windows®, allow installation of a VPN configuration or profile that configures a tunnel client on the client device. In some cases, these operating systems allow installation of a VPN profile on a per-application basis so that certain or all traffic for a particular application is routed through a VPN connection initiated by the tunnel client.

The VPN configuration can specify that network traffic routed through the VPN connection should routed through a VPN tunnel that terminates with a tunnel gateway application or appliance having a particular network address. The tunnel gateway can then route the network traffic from the application to a destination server. The destination server can be located on an internal network that is otherwise inaccessible to devices that are outside of the network. In this sense, the tunnel gateway can act as a proxy to the internal network. In some cases, the destination server can be an address that is on another external network. In this scenario, the user or administrator might require that traffic from a particular application be routed through an encrypted VPN tunnel so that its network traffic is routed through a tunnel gateway that the enterprise controls.

Traffic between an application and a destination server can be encrypted using TLS variants. TLS can allow for robust encryption of communications, but, if misconfigured, TLS or SSL can also be compromised. Modern applications and browsers are capable of detecting weaknesses or misconfiguration by warning the user about the risks associated with navigating to or communicating with compromised TLS domains. However, certain applications allow the user to override the warning at their own risk. This might be a risk that an administrator of an enterprise is not willing to allow its users to assume.

In some cases, the warning messages presented by applications further confuse or frustrate users to the point where the user fails to recognize and dismisses the actual risk presented by the warning. The user might be primarily concerned with completing a particular task within an application that they simply ignore the warnings presented in a prompt generated by the application. Misconfiguration of TLS might occur accidentally, or a misconfiguration can be an indication of an attacker trying to steal information or distract the user.

For example, TLS can be compromised by a man-in-the-middle-attack (MiTM). To prevent this type of attack, SSL pinning can be employed by an administrator. Pinning can ensure that a TLS client is communicating with a particular destination server. However, SSL pinning within a third party application or a non-browser introduces administrative complications because the pinning keys are typically embedded into an application binary or stored after an initial TLS connection with a destination server. However, pinning a public key after an initial TLS connection is not very robust security solution, because if the first connection is compromised, later connections are compromised as well.

Therefore, examples of the disclosure are directed to a tunnel gateway that works in conjunction with a per-app VPN capability of client devices to monitor TLS traffic between the client device and destination servers to overcome the above limitations of certificate pinning practices and also identify TLS misconfigurations that are either out-of-policy for the enterprise or are indications of a compromised connection.

FIG. 1 illustrates an example of a networked environment 100 according to examples of the disclosure. In the depicted network environment 100, an enterprise computing environment 103 is in communication with at least one client device 106 and optionally at least one destination server 107 over a network 119.

The network 119 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The enterprise computing environment 103 can be a computing environment that is operated by an enterprise, such as a business or other organization. The enterprise computing environment 103 includes a computing device, such as a server computer, that provides computing capabilities. Alternatively, the enterprise computing environment 103 can employ multiple computing devices that are arranged in one or more server banks or computer banks. In one example, the computing devices can be located in a single installation. In another example, the computing devices for the enterprise computing environment 103 can be distributed among multiple different geographical locations. In one case, the enterprise computing environment 103 includes multiple computing devices that together can form a hosted computing resource or a grid computing resource. Additionally, the enterprise computing environment 103 can operate as an elastic computing resource where the allotted capacity of computing-related resources, such as processing resources, network resources, and storage resources, can vary over time. In other examples, the enterprise computing environment 103 can include or be operated as one or more virtualized computer instances that can be executed to perform the functionality that is described herein.

The destination server 107 represents at least one computing device external to the client device 106 with which a TLS session can be established. The destination server 107 can be positioned behind a firewall such that it is not externally accessible by network nodes on the Internet unless it is accessed through a tunnel gateway 120. A destination server 107 can also be accessible via the Internet in some cases. In either scenario, for the purposes of explaining examples of the disclosure, the destination server 107 represents a node that implements TLS to facilitate a TLS session with the client device 106 through a tunnel gateway 120.

Various applications or other functionality can be executed in the enterprise computing environment 103. Also, various data can be stored in a data store 112 that can be accessible to the enterprise computing environment 103. The data store 112 can be representative of a plurality of data stores 112. The data stored in the data store 112 can be associated with the operation of the various applications or functional entities described below.

The components executed on the enterprise computing environment 103 can include a management service 116, a tunnel gateway 120, and other applications, services, processes, systems, engines, or functionality not discussed in detail herein. The management service 116 can be executed in the enterprise computing environment 103 to monitor and oversee the operation of one or more client devices 106 by administrators. In some examples, the management service 116 can represent one or more processes or applications executed by an enterprise mobility management (EMM) provider that facilitates administration of client devices 106 of an enterprise that are enrolled with the EMM provider. To this end, the operating system and application ecosystem associated with the client device 106 can provide various APIs and services that allow client devices 106 to be enrolled as managed devices with the management service 116.

The management service 116 can include a management console that can allow administrators to manage client devices 106 that are enrolled with the management service 116. User interfaces can allow an administrator to define policies for a user account or devices associated with an enterprise environment. The user interfaces can also include, for example, presentations of statistics or other information regarding the client devices 106 that can be managed by the management service 116.

The enterprise computing environment 103 can also execute a tunnel gateway 120, which can communicate with a tunnel client 149. In some examples of a tunnel client 149, network traffic is routed through a server process such as the tunnel gateway 120 that determines a termination point on the network 119 for the network traffic. In other examples of a tunnel client 149, the tunnel client 149 employs split routing, where traffic that is destined for a network address on an external network is sent to the termination point on the network 119 and traffic destined for an internal network on a private network is sent to the tunnel gateway 120, which routes traffic to an internal network destination.

The data stored in the data store 112 can include device data 123, user data 127, application data 129, TLS policies 131 and potentially other data. Device data 123 can include records to client devices 106 that are enrolled as managed devices with the management service 116. A record within device data 123 can include various security settings selected for enforcement on a client device 106 that is enrolled with the management service 116. Accordingly, a device record can include a device identifier associated with a device, such as the client device 106, one or more device certificates 124, and a compliance status 125. In some examples, device data 123 can also identify a user associated with a particular client device 106. A device record can also store other device specific information, such as a device type, operating system type or version, applications that are required or optional for the device, or an enrollment status of the device. In this scenario, the device data 123 can also indicate whether a managed device is a computing device or a peripheral device, such as a printer, scanner, or other device that can be deployed in an environment and associated with a record in a directory service.

A device certificate 124 can include a certificate that is generated on behalf of a client device 106 that is enrolled with the management service 116 as a managed device. A device certificate 124 can include a key pair, such as a public and private key that is employed in a public key encryption methodology. A device certificate 124 can also include an X.509 digital certificate that can be used to encrypt communications between the client device 106 and other systems accessible via the network 119. In one example of the disclosure, the management service 116 can generate or obtain a device certificate 124 for a client device 106. In another example of the disclosure, the management service 116 can generate or obtain a device certificate 124 for each application that is installed on the client device 106 by the management service 116.

A compliance status 125 of a client device 106 represents whether the device is in compliance with one or more compliance rules. Various compliance rules can be enforced by the management service 116 by the client device 106. Compliance rules can be based on time, geographical location, or device and network properties. For instance, the client device 106 can satisfy a compliance rule when the client device 106 is located within a particular geographic location. The client device 106 can satisfy a compliance rule in other examples when the client device 106 is in communication with a particular local area network, such as a particular local area network that is managed by the enterprise computing environment 103. Furthermore, a compliance rule in another example can be based upon the time and date matching specified values.

A compliance rule can specify that a client device 106 is required to be off or in a low power "sleep" state during a specified time period. Another compliance rule can specify that a client device 106 is required to be on or in a normal operation "awake" state during a specified time period. As another example, a compliance rule can specify that a client device 106 is prohibited from rendering content that has been designated as confidential.

Another example of a compliance rule involves whether a user belongs to a particular user group. For instance, a compliance rule can include a whitelist or a blacklist that specifies whether particular users or groups of users are authorized to perform various functionalities, such as installing or executing a particular application.

Other examples of compliance rules include a rule that specifies whether a client device 106 is compromised or "jailbroken." For example, a client device 106 can have hardware or software protections in place that prevent unauthorized modifications of the client device 106. If these protections are overridden or bypassed, the client device 106 can be considered out of compliance. As another example, a compliance rule can specify that the client device 106 is required to prompt a user for a password or personal identification number (PIN) in order to unlock the device.

A compliance rule can also require that the client device 106 have device encryption enabled, where data stored on the device is stored in an encrypted form. The data can be encrypted by a device certificate 124. A compliance rule can also specify that the client device 106 is enrolled with the management service 116 as a managed device. Another compliance rule can specify that the user is required to accept the terms of service that are presented by the management component 145 on the client device 106. As another example, a compliance rule can specify that the management component 145 is required to periodically communicate or "check-in" with the management service 116 to report on its status. If a threshold amount of time has elapsed since the previous check-in of the client device 106, the device can be considered to have violated this compliance rule.

Another compliance rule can specify that a client device 106 be running one of a specified variants or versions of a particular operating system. A compliance rule can also specify that an enrolled device be manufactured by a particular manufacturer or have a particular manufacturer identifier. Another compliance rule can specify that an enrolled device be a particular model name or model number. A client device 106 can also be considered out of compliance if the device is in a data roaming mode or has used a threshold amount of a periodic network data usage allowance.

Accordingly, the compliance status 125 indicates whether and to what extent a particular client device 106 is compliant with compliance rules assigned to the client device 106 by the management service 116. The compliance status 125 can be determined by a management component 145 on the client device 106 that analyzes the status of the client device 106 and reports compliance to the management service 116. In other examples, the compliance status 125 can be determined by the management service 116 based upon information about the status of the client device 106 that is reported by the management component 145. In examples of the disclosures, the compliance status 125 can also be determined by the identity provider 118 or management service 116 based upon an analysis of device identification parameters that are embedded within an authentication request originating from an application 147 or application service 107 associated with the application 147.

User data 127 contains information about users who are associated with client devices 106 that are enrolled with the management service 116. User data 127 can include profile information about a user, authentication information about a user, applications that are installed on client devices 106 associated with the user, and other user information. For example, user data 127 can include information about client devices 106 that are associated with a user account of the user, enterprise resources to which a particular user has access, such as email, calendar data, documents, media, applications, network sites, or other resources. The user data 127 can also identify one or more user groups of which a particular user is a member, which can in turn define the access rights of the user to one or more enterprise resources as well as identify which applications should be deployed to a client device 106 associated with the user. To this end, the user data 127 can further identify one or more device identifiers that can uniquely identify client devices 106 that are associated with a user account of the user.

Application data 129 represents data about applications that can be deployed through the management service 116 to client devices 106 that are enrolled as managed devices. Application data 129 can include application binaries or packages, a reference to a publicly accessible repository from which an application 147 can be obtained, and licensing or authentication data for an application 129. Application data 129 can also store configuration data for each client device 106 on which a copy of an application 147 is installed. The configuration data can include data about a VPN configuration 151 on the client device 106 through which application traffic can be routed. Such a VPN configuration 151 can route network traffic through a VPN tunnel created with the tunnel gateway 120.

TLS policies 131 can include various policies that the tunnel gateway 120 can enforce against connection attempts made between a client device 106 and a destination server 107. The TLS policies 131 can vary in scope. For example, certain TLS policies 131 can be global in nature such that they apply to any traffic between the client device and a destination server 107 no matter which application 147 is attempting to establish a particular TLS session. For example, a TLS policy 131 can verify the TLS configuration of an application 147 that is initiating a TLS session with a destination server 107. The TLS policy 131 can specify that certain allowable TLS versions, which are specified in the TLS record header of a TLS client hello message that is sent by an application 147 through a tunnel client 151 to the tunnel gateway 120. A TLS policy 131 can also specify allowable or disallowed cipher suites, certain X.509 certificates, a minimum key length with which a leaf certificate is signed, whether app transport security (ATS) is enforced on a connection attempt, and other properties of a TLS connection attempt made by the application 147.

A TLS policy 131 can also be specific to a particular application 147 that is initiating a TLS session with a destination server 107. For example, if a particular application 147 attempts to establish set up a TLS session with a destination server 107, the tunnel gateway 120 can ensure that a particular certificate is used to secure the TLS session. In other words, the tunnel gateway 120 can assert control over the pinning keys when SSL pinning is employed. In this scenario, the application does not need to bundle the pinning keys into the application itself or implement pinning logic. Additionally, an administrator can update the pinning keys without can update the pinning keys for a particular destination server 107 without the application needing to update the pinned keys or updates its pinning logic.

A TLS policy 131 can further specify aspects of a destination server 107 that must be met for a TLS session to be allowed by the tunnel gateway 120. TLS policies 131 can verify aspects of the destination server's certificate, such as whether it is an X.509 certificate that is in ASN.1 format in DER encoded form. A TLS policy 131 can also specify parameters with respect to the certificate's validity duration, signing algorithms, certificate path, and server hostname to verify the TLS deployment of the destination server 107 and its authenticity.

The client device 106 can represent multiple client devices 106 coupled to the network 119. The client device 106 includes, for example, a processor-based computer system. According to various examples, a client device 106 can be in the form of a desktop computer, a laptop computer, a personal digital assistant, a mobile phone, a smartphone, or a tablet computer system. The client device 106 can represent a device that is owned or issued by the enterprise to a user, or a device that is owned by the user. The client device 106, when provisioned, can be enrolled with the management service 116 as a managed device of the enterprise.

The client device 106 can execute a management component 145 that can communicate with the management service 116 to facilitate management of the client device 106. The management component 145 can communicate with the management service 116 to enforce management policies and compliance rules on the client device 106. For example, the management component 145 can enforce data security requirements, install, remove or update security certificates, or write, modify or delete certain data from the client device 106. The management component 145 can also monitor network activity of the client device 106, the location of the client device 106, enforce password or personal identification number (PIN) requirements, or any other security or acceptable-use policies that are defined in the management service 116 and sent to the management component 145 over the network 119.

To carry out local management of a client device 106, the management component 145 can be installed and executed with elevated or administrative privileges on the client device 106. In some scenarios, the operating system can allow a particular application or package to be identified as a device owner or a device administrator.

One or more applications 147 can be installed on the client device 106. As a managed device that is enrolled with the management service 116, some applications 147 can be installed by the management service 116. In one scenario, the management service 116 can send a request to the management component 145 to retrieve and install a particular application 147 on the client device 106. In this sense, installation of the application is initiated by the management service 116. The management service 116 can also provide configuration data for a particular application 147 that it installed on the client device 106. For example, the management service 116 can transmit policies or profiles that instruct the client device 106 to route some or all network traffic from the application 147 through the tunnel client 149. The tunnel client 149 can secure the traffic by applying a security layer, such as an encryption layer, to the traffic. In other words, the tunnel client 149 can initiate TLS sessions with one or more destination servers 107 on behalf of the application 147. Network traffic for the TLS session can be routed through the tunnel gateway 120, which can inspect parameters in TLS client hello and TLS server hello messages to determine whether the TLS session is in compliance with one or more TLS policies 131 enforced by the enterprise.

The client device 106 can execute a tunnel client 149 that provides for network tunneling or VPN capabilities. The operating system of the client device 106, in some examples, can also allow VPN capabilities to be bound to one or more applications 147. In other words, the tunnel client 149 can provide per-app VPN capabilities where some or all network traffic originating from an application 147 is muted through the tunnel client 149. In some example, traffic routed through the tunnel client 149 can be secured using a device certificate 124 generated or obtained by the management service 116, which can be installed on the client device 106 by the management component 145 upon receiving the device certificate 124 from the management service 116.

As noted above, a separate VPN configuration 151 can be used for each application 147 installed on the client device 106. For example, an enterprise may prefer that network traffic sent and received from particular application 147 be routed through the tunnel client 149 according to a particular VPN configuration 151. The VPN configuration 151 can also specify what device identifying information is embedded into packets or records that are routed through the tunnel client 149. For example, the VPN configuration 151 can specify that TLS should be employed to secure traffic from a particular application 147 and that device identifying parameters, such as a network address of the client device 106, a geolocation of the client device 106, a timestamp, an identity of the application 147, a device identifier of the client device 106, an operating system version, user-identifying information such as a user identifier, or other device identifying parameters that can be extracted from the operating system or the management component 145.

The VPN configuration 151 can include settings for a VPN connection to be used by the tunnel client 149 to connect to a corresponding VPN. For example, the VPN configuration 151 can include a username, a password, a digital certificate, an address of a VPN server, such as the tunnel gateway 120, a communications protocol (e.g. PPP, IPsec, a secure sockets layer (SSL) or transport layer security (TLS) based VPN protocol, or some other VPN protocol) for the VPN connection. In some instances, the VPN configuration 151 can also specify values for various settings of the tunnel client 149. For example, the VPN configuration 151 can specify which Domain Name System (DNS) servers to use with the tunnel client 149, which IP address or addresses to assign to or associate with the tunnel client 149, the subnet mask of the tunnel client 149, the media access control (MAC) address to assign to or associate with the tunnel client 149, and potentially other settings for the tunnel client 149.

The VPN configuration 151 can be obtained by the management component 145 from the management service 116 and installed as a profile on the client device 106. In one example, the management service 116 can initiate installation of a particular application 147 and generate a VPN configuration 151 that is transmitted to and installed by the management component 145 on the client device 106. The VPN configuration 151 can be specifically generated by the installation of the application 147. The VPN configuration 151 can cause the operating system of client device 106 to route some or all network traffic originating from the application 147 through a VPN connection that is established by the tunnel client 149 through the tunnel gateway 120 to a destination server 107.

The destination server 107 represents one or more servers associated with a service that the application 147 might access over the network 119. For example, a particular application 147 deployed onto the client device 106 might require access to an internet or cloud-based service. In this scenario, the application 147 can request content from the destination server 107. In some scenarios, the request for content can be tunneled through the tunnel client 149 in a TLS session established with the destination server 107.

The VPN configuration 150 established for a particular application 147 can specify that the tunnel client 149 establish a VPN connection through the tunnel gateway 120 to the destination server 107. The tunnel gateway 120 can then inspect TLS handshake messages that are exchanged between the tunnel client 149 on behalf of an application 147 and the destination server 107 as a part of a connection attempt between the application 147 and destination server 107. If an aspect of the TLS handshake messages violates a TLS policy 131, the tunnel gateway 120 can terminate the connection attempt between the application 147 and destination server 107. In other words, the tunnel gateway 120 can prevent a TLS session from being established between the application 147 and destination server 107.

The tunnel gateway 120 can also notify an end user or an administrator in the event of termination of a TLS session. For example, the tunnel gateway 120 can send a notification to the user's client device 106 as a push notification through Apple Push Notification Service (APNS), Android Push Notification, or any other push notification protocol or system that allows push notification to be sent to the user's device. In one scenario, the tunnel gateway 120 can notify the management service 116 when a TLS session is terminated, which can cause a push notification with details about the event to the user. The push notification can inform the user why a connection attempt between the application 147 and destination server 107 was terminated.

The tunnel gateway 120 can also notify an administrator of the management service 116 with details regarding the client device 106, application 147, and destination server 107 for a terminated connection attempt. In this way, the tunnel gateway 120 can assist an administrator with identifying potential attackers who are attempting to use TLS to gain access to a user's credentials or perform other breaches of network security. In response to detection of the termination of a connection attempt, the administrator can require the user to reset his or her password, issue new pinning keys to the tunnel gateway 120, issue a new device certificate to a client device 106 or perform other remediation steps to bolster network or device security.

Additionally, although described as a part of enterprise computing environment 103, the management service 116 and tunnel gateway 120 can be third-party services relative to each other, on-premises services, cloud-based services, or services provided by a single entity.

Figure 2:
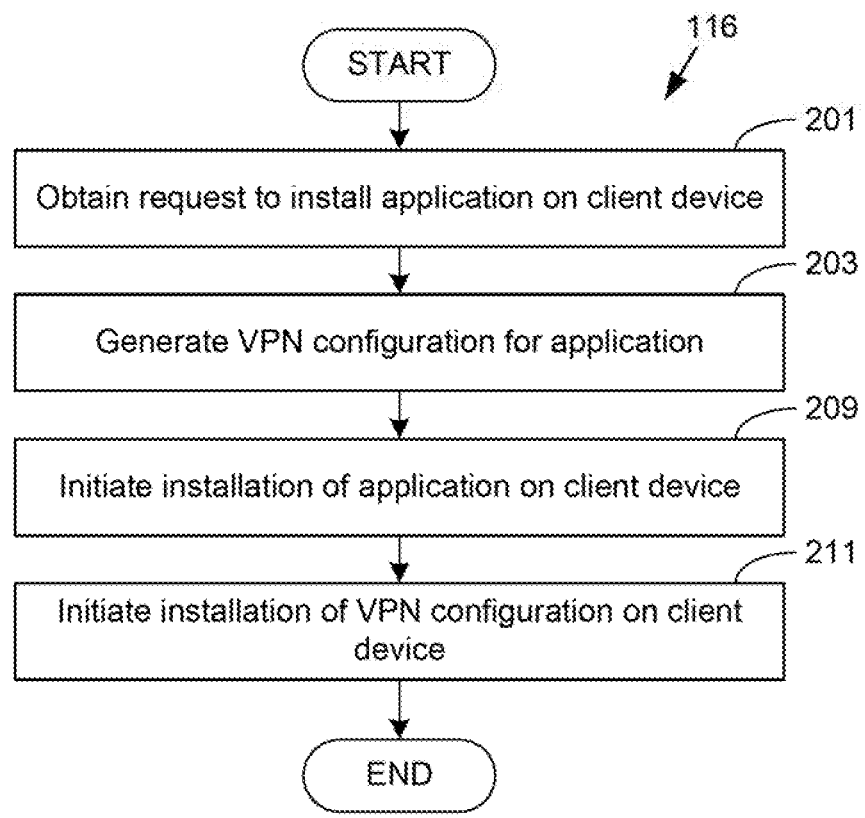
FIG. 2 is a flowchart that illustrates functionality according to a first example of the disclosure.

Referring next to FIG. 2, shown is a flowchart that provides one example of how the management service 116 can deploy an application 147 to a managed device and install a VPN configuration 151 that is associated with the application 147 so that authentication requests are routed through the tunnel client 149 and the tunnel gateway 120 to the destination server 107. The process shown in FIG. 2 assumes that the client device 106 is enrolled with the management service 116 as a managed device so that the management service 116 can install applications, configuration profiles, device certificates, and issue management commands to the client device 106.

First, at step 201, the management service 116 can obtain a request to install an application 147 on the client device 106. The application 147 requested by the user can be associated with a policy whereby an administrator has designated that network traffic should be routed through the tunnel client 149 and tunnel gateway 120 to reach one or more destination servers 107. The application 147 can also be associated with one or more TLS policies 131 that can be enforced by the tunnel gateway 120 once the application 147 is installed and setup to route its network traffic through the tunnel client 149 and tunnel gateway 120.

At step 203, the management service 116 can generate a VPN configuration 151 for the requested application 147. The VPN configuration 151 can be generated for the operating system run by the client device 106 and specify that some or all of the network traffic from the application 147 should be routed through the tunnel client 149. The VPN configuration 151 can also specify the VPN protocol that should be utilized to secure the VPN tunnel. The VPN configuration 151 can specify a particular device certificate installed on the client device 106 that should be used by the VPN client 149 to secure a VPN tunnel that is constructed between the client device 106 and the tunnel gateway 120.

In one example, the management service 116 can provide the device certificate 124 to the management component 145, which can save or install the device certificate 124 in an area on the client device 106 that is accessible only to the applications 147 that are deployed by the management service 116 or by certain applications and services. The applications and services can be identified by the management service 116 or by the operating system. In one example, access to the device certificate 124 can be limited to the tunnel client 149.

At step 209, the management service 116 can initiate installation of the requested application 147 on the client device 106. In one example, the management service 116 can transmit a command to the management component 145 to download and install the application 147 from a public application repository. The application 147 can be installed and managed by the management component 145.

At step 211, the management service can initiate installation of a VPN configuration 151 on the client device 106. As noted above, the VPN configuration 151 can be linked with the application 147 such that some or all network traffic originating from the application 147 is routed through a tunnel client 149 that tunnels traffic over a VPN connection. The VPN configuration 151 can route network traffic from the application 147 through a VPN tunnel that terminates with the tunnel gateway 120. Because network traffic from the application is routed through the VPN client 149 and tunnel gateway 120, the tunnel gateway 120 has the ability to inspect network traffic from the application 149, which would include TLS handshake messages, such as a TLS client hello message, a TLS server hello message, a Server/Client Certificate message, CertificateRequest, ServerKeyExchange, ClientKeyExchange, ChangeCipherSpec and Finished message. The tunnel gateway 120 can inspect any of these TLS handshake messages that exchanged between an application 149 and destination server 107 for violations of one or more TLS policies 131. Should the tunnel gateway 120 detect a violation of a TLS policy 131, the tunnel gateway 120 can terminate a TLS connection attempt between the application 147 and destination server 107.

In some examples, the VPN configuration 151 can specify that all network traffic should be sent to the tunnel gateway 120 over a VPN connection. The tunnel gateway 120 can then route traffic from the application 147 to the destination server 107. Return traffic from the destination server 107 can be sent to the tunnel gateway 120, which can route the traffic back to the tunnel client 149 and subsequently to the application 147. Thereafter, the process proceeds to completion.

Figure 3:
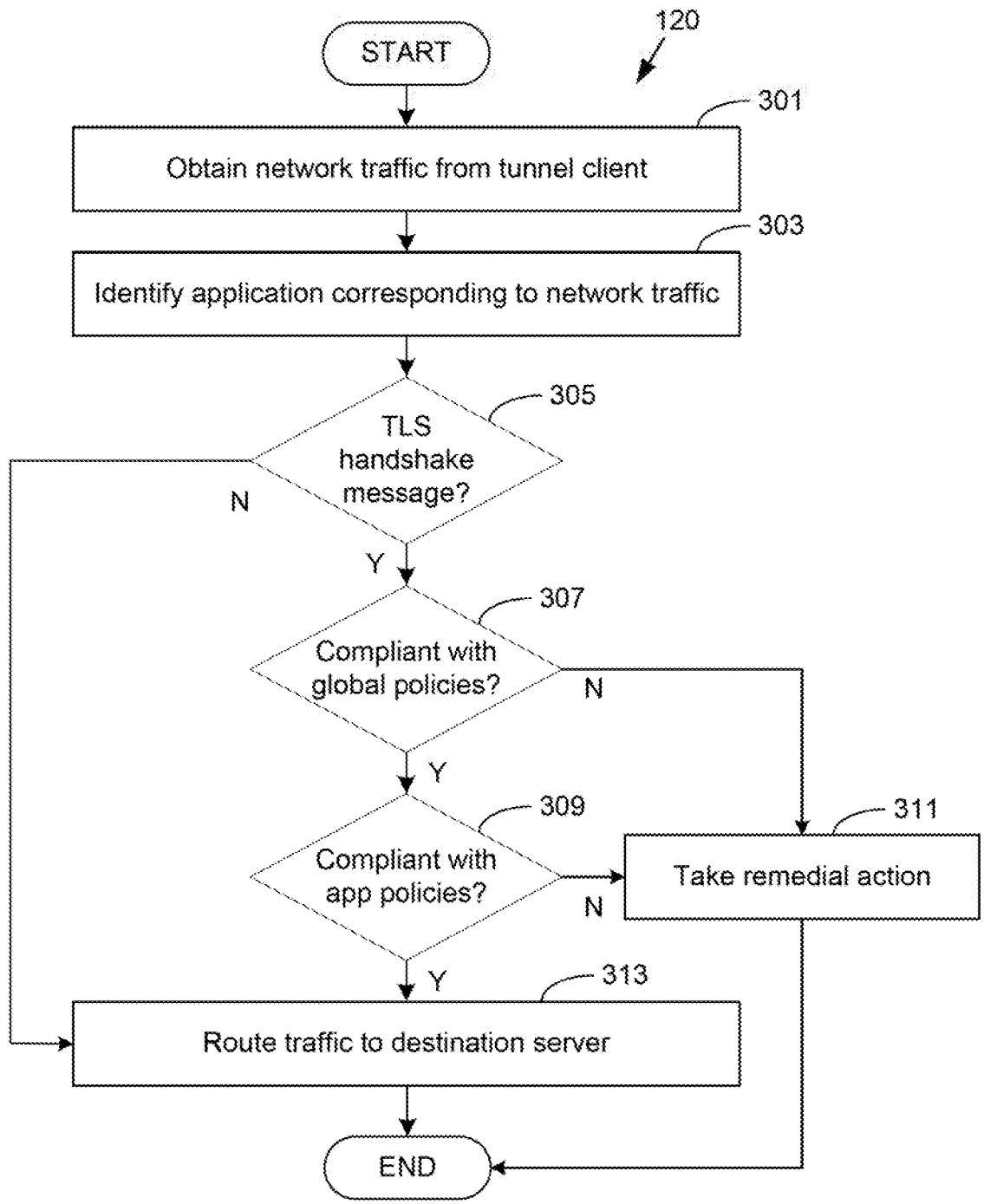
FIG. 3 is a flowchart that illustrates functionality according to a second example of the disclosure.

Referring next to FIG. 3, shown is a flowchart that provides one example of how the tunnel gateway 120 can enforce TLS policies 131 on a connection attempt made by an application 147 with a destination server 107. First, at step 301, the tunnel client 120 can obtain network traffic originating from an application 147 on the client device 106 from the tunnel client 149. As described in the process shown in FIG. 2, the management service 116 can deploy an application 147 along with a VPN configuration 151 that instructs the operating system to route network traffic for the application 147 through the tunnel client 149. The tunnel client 149 in turn routes the network traffic through a VPN tunnel established with the tunnel gateway 120, which can forward the network traffic to an appropriate destination server 107.

At step 303, the tunnel gateway 120 can identify an application 147 corresponding to the network traffic received from the tunnel client 149. The tunnel client 149 can embed an identifier corresponding to the application 147 in a packet header or other portion of the network traffic originating from the application 147. For example, the tunnel gateway 120 can extract or generate a certificate signature from the security layer applied to the authentication request by the tunnel client 149. In some instances, the certificate used to encrypt or secure the network traffic can be unique to the application 147. The tunnel gateway 120 can identify the particular instance of the application 147 installed on the client device 106 based upon this signature.

At step 305, the tunnel gateway 120 can determine whether the network traffic corresponds to a TLS handshake between the application 147 and a destination server. In the case of an application 147 initiating a TLS session with a destination server, a TLS handshake message can be sent unencrypted, which means the tunnel gateway 120 and/or tunnel client 149 can inspect the TLS handshake message. If the network traffic does not correspond to a TLS handshake, the tunnel gateway 120 can proceed to step 313. If the network traffic does correspond to a TLS handshake message, such as a client hello, server hello, a Server/Client Certificate message, CertificateRequest, ServerKeyExchange, ClientKeyExchange, ChangeCipherSpec or a Finished message according to the TLS specification, the process can proceed to step 307.

At step 307, the tunnel gateway 120 can determine whether an aspect of the handshake message violates a TLS policy 131 that is global in nature that applies to all TLS connection attempts made between the client device 106 and destination servers 107. For example, the TLS gateway 120 can inspect a server name indication (SNI) specified by the TLS client hello message or TLS server hello message and determine whether the values are unapproved values according to one or more TLS policies 131. An unapproved SNI in a hello message can be an indication of an attacker or an unapproved connection attempt.

As another example, the tunnel gateway 120 can determine whether the cipher suite specified by a TLS handshake message, such as in a TLS server hello message, is an unapproved cipher suite identified in a TLS policy 131. An unapproved cipher suite in a hello message can also be an indication of an attacker or an unapproved connection attempt. A TLS policy 131 can also approve or whitelist certain cipher suites, SNI's, or other parameters as approved TLS connection properties in addition to identifying unapproved aspects of a TLS connection between an application 147 and destination server 107.

Additionally, the tunnel gateway 120 can also enforce SSL or public-key pinning. An administrator can pin certain certificates that are allowed to be used with one or more destination servers 107 in the tunnel gateway 120. If an application 147 attempts a TLS session with a destination server 107 and a TLS handshake message identifies a public key that is not pinned within the tunnel gateway 120, the tunnel gateway can determine that an unapproved certificate is being used in the TLS connection attempt. The tunnel gateway 120 can determine whether the unapproved or unpinned certificate is being used by the client device 106 or destination server 107 by analyzing the certificate signature or public key that is specified in a TLS handshake message exchanged between the application 147 and destination server 107. The tunnel gateway 120 can identify the certificate presented by the destination server 107 in a TLS handshake certificate message or server key exchange message that is sent by the application 147 or destination server 107.

The tunnel gateway 120 can also enforce one or more TLS policies 131 that specify certain allowable TLS versions, which are identified in the TLS record header of a TLS client hello message or TLS server hello message that is exchanged between an application 147 through a tunnel client 149 and the destination server 107. In some cases, the TLS version is also contained in a TLS record header. A TLS policy 131 can also specify allowable or disallowed cipher suites, certain X.509 certificates, a minimum key length with which a leaf certificate is signed, whether app transport security (ATS) is enforced on a connection attempt, and other properties of a TLS connection attempt made by the application 147.

If the tunnel gateway 120 detects that an aspect of a TLS handshake message violates a TLS policy 131, the process can proceed to step 311, where the tunnel gateway 120 can take a remedial action based upon the violation of the TLS policy 131. If the tunnel gateway 120 detects that the TLS handshake message is compliant with the global TLS policies 131, the process can proceed to step 309.

At step 307, the tunnel gateway 120 can determine whether an aspect of the handshake message violates a TLS policy 131 that applies to TLS connection attempts made between the particular application 147 and one or more destination servers 107. An administrator can define TLS policies 131 that are only applicable to a particular application 147. The app-specific TLS policies 131 can apply to the same characteristics or parameters related to a TLS session that are detected in step 305. If any aspect of the TLS handshake messages violate an app-specific TLS policy 131, the process can proceed to step 311, where the tunnel gateway 120 can take a remedial action based upon the violation of the TLS policy 131. Otherwise, if the tunnel gateway 120 detects that the TLS handshake message is compliant with the app-specific TLS policies 131, the process can proceed to step 313.

At step 311, the tunnel gateway 120 can take a remedial action on a TLS connection attempt made by the application 147 that violates one or more TLS policies 131. A specific remedial action can be specified by a TLS policy 131 that is violated, or the same remedial action can applied to all TLS policy 131 violations.

In one example, the tunnel gateway 120 can terminate the connection attempt made by the application 147 to the destination server 107. Because network traffic from the application 147 is routed through the tunnel gateway 120 by the tunnel client 149 as specified by the VPN configuration 151, the tunnel gateway 120 can avoid forwarding the network traffic to the destination server 107 or refuse the attempt made by the application 147 to connect to the destination server 107. In this example, the tunnel gateway 120 can cause a push notification to be sent to the client device 106 of the user that informs the user that the connection attempt has been terminated. The push notification can be sent through APNS, Google Cloud Messaging, AirWatch Cloud Messaging, or other push notification protocols that allow a push notification to be sent to a user's device. In some examples, the push notification can be received by the management component 145 on the client device 106.

In another example, the tunnel gateway 120 can, without terminating the connection attempt, send a push notification to the client device 106 on which the application 147 is executed that informs the user about the TLS policy violation 131. Again, the push notification can be sent through APNS, Google Cloud Messaging, AirWatch Cloud Messaging, or other push notification protocols that allow a push notification to be sent to a user's device. The push notification can also be received by the management component 145 on the client device 106.

The tunnel gateway 120 can also notify an administrator about a TLS policy 131 violation. The notification can identify a user associated with the client device 106, an application 147 causing the policy violation, and/or the specific policy violation that occurred. Notifying an administrator can take the form of an email or other type of messaging or presenting the policy violation in an administrative user interface. Notifying an administrator can take place in addition to terminating the connection attempt or notifying the user via a push notification about a TLS policy 131 violation. Thereafter, the process can proceed to completion.

At step 313, if no TLS policy 131 violations are detected by the tunnel gateway 120, the tunnel gateway can route the network traffic to the destination server 107. If no TLS policy 131 violations are detected, this is an indication that the TLS connection attempt is in compliance with the TLS policies 131 specified by the enterprise. Thereafter, the process can proceed to completion.

Figure 4:
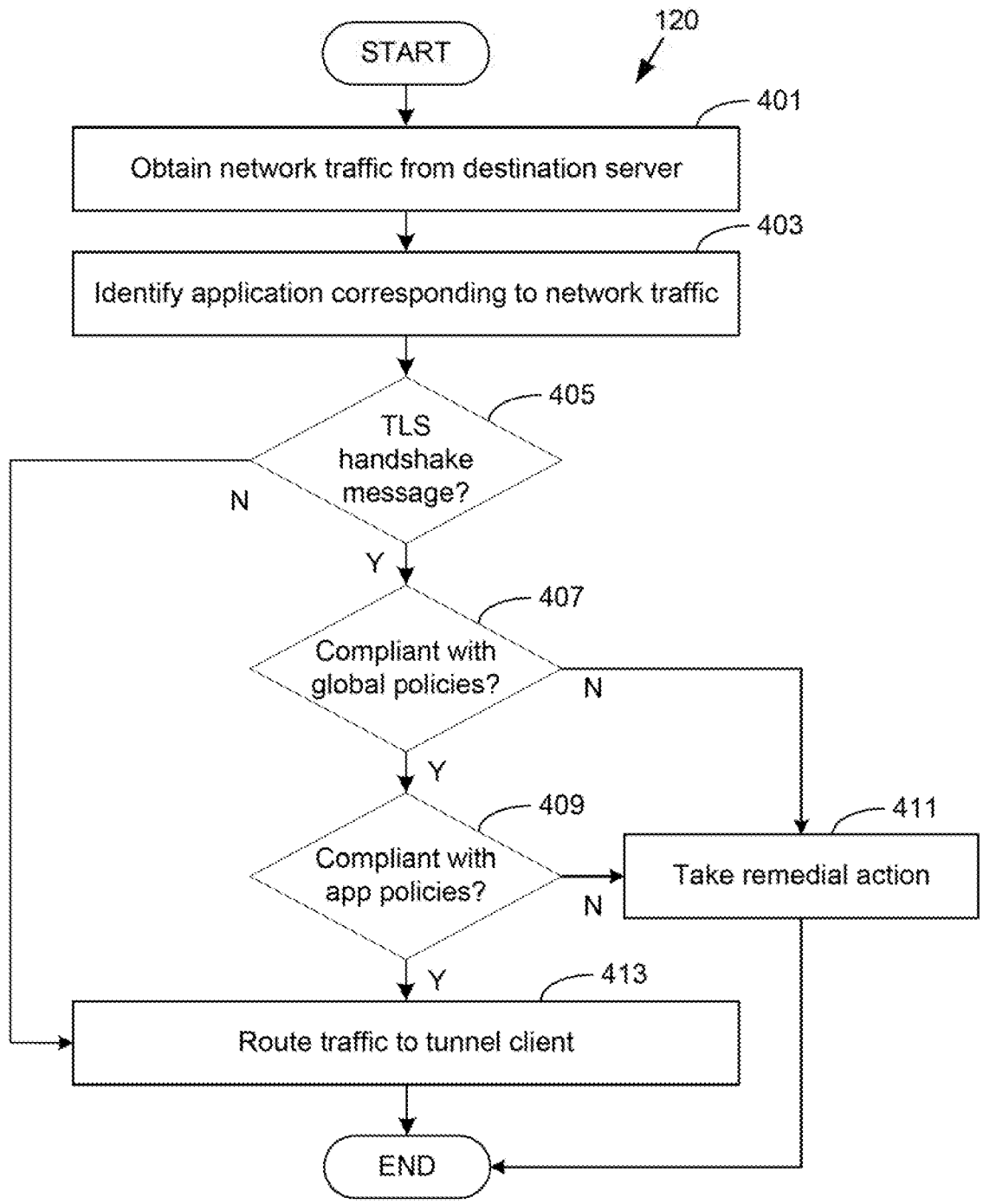
FIG. 4 is a flowchart that illustrates functionality according to a third example of the disclosure.

Referring next to FIG. 4, shown is a flowchart that provides one example of how the tunnel gateway 120 can enforce TLS policies 131 by analyzing a return TLS handshake message from a destination server 107 to a client device 106 in response to a connection attempt made by an application 147. First, at step 401, the tunnel client 120 can obtain network traffic originating from a destination server 107 that is intended for an application 147 on the client device 106 by way of the tunnel client 149. As described in the process shown in FIG. 2, the management service 116 can deploy an application 147 along with a VPN configuration 151 that instructs the operating system to route network traffic for the application 147 through the tunnel client 149. The tunnel client 149 in turn routes the network traffic through a VPN tunnel established with the tunnel gateway 120, which can forward the network traffic to an appropriate destination server 107. Therefore, return traffic from the destination server 107 is sent to the tunnel gateway 120, which can identify the application 147 and client device 106 to which the return traffic is addressed based upon information contained in the packets comprising the traffic.

At step 403, the tunnel gateway 120 can identify an application 147 corresponding to the network traffic received from the destination server 107. Again, return traffic from the destination server 107 is sent to the tunnel gateway 120, which can identify the application 147 and client device 106 to which the return traffic is addressed based upon information contained in the packets comprising the traffic.

At step 405, the tunnel gateway 120 can determine whether the network traffic corresponds to a TLS handshake between the application 147 and a destination server 107. A TLS handshake message can be sent unencrypted, which means the tunnel gateway 120 and/or tunnel client 149 can inspect the TLS handshake message. If the network traffic does not correspond to a TLS handshake, the tunnel gateway 120 can proceed to step 413. If the network traffic does correspond to a TLS handshake message, such as a client hello, server hello, a Server/Client Certificate message, CertificateRequest, ServerKeyExchange, ClientKeyExchange, ChangeCipherSpec or a Finished message according to the TLS specification, the process can proceed to step 407.

At step 407, the tunnel gateway 120 can determine whether an aspect of the handshake message violates a TLS policy 131 that is global in nature that applies to all TLS connection attempts made between the client device 106 and destination servers 107. As in the process shown in FIG. 3, the TLS gateway 120 can inspect a server name indication (SNI) specified by the TLS client hello message or TLS server hello message and determine whether the values are unapproved values according to one or more TLS policies 131. An unapproved SNI in a hello message can be an indication of an attacker or an unapproved connection attempt.

The tunnel gateway 120 can determine whether the cipher suite specified by a TLS handshake message, such as in a TLS hello message, is an unapproved or banned cipher suite identified in a TLS policy 131. An unapproved cipher suite in a hello message can also be an indication of an attacker or an unapproved connection attempt. A TLS policy 131 can also approve or whitelist certain cipher suites, SNI's, or other parameters as approved TLS connection properties in addition to identifying unapproved aspects of a TLS connection between an application 147 and destination server 107.

Additionally, as noted above, the tunnel gateway 120 can also enforce SSL or public-key pinning. An administrator can pin certain certificates that are allowed to be used with one or more destination servers 107 in the tunnel gateway 120. If a certificate presented in a TLS handshake message received from a destination server 107 identifies a public key for the destination server 107 that is not pinned within the tunnel gateway 120, the tunnel gateway can determine that an unapproved certificate is being used in the TLS connection attempt. The tunnel gateway 120 can determine whether the unapproved or unpinned certificate is being used by analyzing the certificate signature or public key that is specified in a TLS handshake message exchanged between the application 147 and destination server 107. The tunnel gateway 120 can identify the certificate presented by the destination server 107 in a TLS handshake certificate message or server key exchange message that is sent by the application 147 or destination server 107.

The tunnel gateway 120 can also enforce one or more TLS policies 131 that specify certain allowable TLS versions, which are identified in the TLS record header of a TLS client hello message or TLS server hello message that received from the destination server 107. In some cases, the TLS version is also contained in a TLS record header. A TLS policy 131 can also specify allowable or disallowed cipher suites, certain X.509 certificates, a minimum key length with which a leaf certificate is signed, whether app transport security (ATS) is enforced on a connection attempt, and other properties of a TLS connection attempt made by the application 147.

If the tunnel gateway 120 detects that an aspect of a TLS handshake message violates a TLS policy 131, the process can proceed to step 411, where the tunnel gateway 120 can take a remedial action based upon the violation of the TLS policy 131. If the tunnel gateway 120 detects that the TLS handshake message is compliant with the global TLS policies 131, the process can proceed to step 309.

At step 407, the tunnel gateway 120 can determine whether an aspect of the handshake message violates a TLS policy 131 that applies to TLS connection attempts made between the particular application 147 and one or more destination servers 107. An administrator can define TLS policies 131 that are only applicable to a particular application 147. The app-specific TLS policies 131 can apply to the same characteristics or parameters related to a TLS session that are detected in step 405. If any aspect of the TLS handshake messages violate an app-specific TLS policy 131 at step 409, the process can proceed to step 411, where the tunnel gateway 120 can take a remedial action based upon the violation of the TLS policy 131. Otherwise, if the tunnel gateway 120 detects that the TLS handshake message is compliant with the app-specific TLS policies 131, the process can proceed to step 413 from step 409.

At step 411, the tunnel gateway 120 can take a remedial action on a TLS connection attempt between the destination server 107 and the application 147 that violates one or more TLS policies 131. A specific remedial action can be specified by a TLS policy 131 that is violated, or the same remedial action can applied to all TLS policy 131 violations.

In one example, the tunnel gateway 120 can terminate the connection attempt between the application 147 to the destination server 107. Because network traffic from the application 147 is routed through the tunnel gateway 120 by the tunnel client 149 as specified by the VPN configuration 151, the tunnel gateway 120 can avoid forwarding the network traffic to the application 147 or refuse the attempt made by the destination server 107 to connect to the application 147. In this example, the tunnel gateway 120 can cause a push notification to be sent to the client device 106 of the user that informs the user that the connection attempt has been terminated. The push notification can be sent through APNS, Google Cloud Messaging, AirWatch Cloud Messaging, or other push notification protocols that allow a push notification to be sent to a user's device. In some examples, the push notification can be received by the management component 145 on the client device 106.

In another example, the tunnel gateway 120 can, without terminating the connection attempt, send a push notification to the client device 106 on which the application 147 is executed that informs the user about the TLS policy violation 131. Again, the push notification can be sent through APNS, Google Cloud Messaging, AirWatch Cloud Messaging, or other push notification protocols that allow a push notification to be sent to a user's device. The push notification can also be received by the management component 145 on the client device 106.

The tunnel gateway 120 can also notify an administrator about a TLS policy 131 violation. The notification can identify a user associated with the client device 106, an application 147 causing the policy violation, and/or the specific policy violation that occurred. Notifying an administrator can take the form of an email or other type of messaging or presenting the policy violation in an administrative user interface. Notifying an administrator can take place in addition to terminating the connection attempt or notifying the user via a push notification about a TLS policy 131 violation. Thereafter, the process can proceed to completion.

At step 413, if no TLS policy 131 violations are detected by the tunnel gateway 120, the tunnel gateway can route the network traffic to the application 147. If no TLS policy 131 violations are detected, this is an indication that the TLS connection attempt is in compliance with the TLS policies 131 specified by the enterprise. Thereafter, the process can proceed to completion.

The flowcharts of FIGS. 2-4 show an example of the functionality and operation herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 2-4 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The client device 106, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 116, tunnel gateway 120, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

What is claimed is:

1. A system for authenticating a user and determining a device posture during authentication, comprising:
   at least one computing device comprising a processor and a memory; and
   a tunnel gateway executed by the at least one computing device, the tunnel gateway causing the at least one computing device to at least:
      obtain a transport layer security (TLS) client hello message according to a TLS handshake over a virtual private network (VPN) tunnel established between a client device and the tunnel gateway, the TLS client hello message comprising a connection attempt between a destination server and the client device;
      identify an aspect of the connection attempt based upon the TLS handshake, wherein the TLS client hello message originates from an application installed on the client device and is routed to the tunnel gateway using a per-application VPN capability of an operating system of the client device that causes all network traffic from the application to be routed to the tunnel gateway;
      identify the application based upon data embedded into the TLS client hello message by the per-application VPN capability;
      identify a TLS policy corresponding to the application; and
      terminate the connection attempt between the client device and the destination server in response to determining that the aspect of the TLS handshake violates the TLS policy.

2. The system of claim 1, wherein the connection attempt between the client device and the destination server is terminated by the tunnel gateway in response to a server name indication (SNI) or a TLS version specified by the TLS client hello message comprising an unapproved value for the identified application.

3. The system of claim 1, wherein the connection attempt between the client device and the destination server is terminated in response to detecting an aspect of a TLS server hello message sent by the destination server to the client device through the tunnel gateway.

4. The system of claim 3, wherein the tunnel gateway causes the at least one computing device to at least terminate the connection attempt in response to a cipher suite specified by the TLS server hello message comprising an unapproved cipher suite, wherein at least one approved cipher suite is associated with the application in the tunnel gateway.

5. The system of claim 1, wherein the tunnel gateway causes the at least one computing device to identify a pinned certificate associated with the destination server in the tunnel gateway, and the tunnel gateway terminates the connection attempt in response to a certificate provided by the destination server being different from the pinned certificate.

6. The system of claim 5, wherein the tunnel gateway causes the at least one computing device to at least terminate the connection attempt in response to the certificate provided by the destination server being signed by an unapproved certificate authority.

7. The system of claim 1, wherein the tunnel gateway causes the at least one computing device to at least cause a push notification to be transmitted to the client device in response to terminating the connection attempt, the push notification comprising a message indicating that the connection attempt has been terminated.

8. A method comprising:
   obtaining a transport layer security (TLS) client hello message according to a TLS handshake over a virtual private network (VPN) tunnel established between a client device and a tunnel gateway, the TLS client hello message comprising a connection attempt between a destination server and the client device;

identifying a property of the connection attempt based upon the TLS handshake, wherein the TLS client hello message originates from an application installed on the client device and is routed to the tunnel gateway using a per-application VPN capability of an operating system of the client device that causes all network traffic from the application to be routed to the tunnel gateway;

identifying the application based upon data embedded into the TLS client hello message by the per-application VPN capability;

identifying a TLS policy corresponding to the application; and terminating the connection attempt between the client device and the destination server in response to determining that an aspect of the TLS handshake violates the TLS policy.

9. The method of claim 8, wherein the connection attempt between the client device and the destination server is terminated by the tunnel gateway in response to a server name indication (SNI) or a TLS version specified by the TLS client hello message comprising an unapproved value for the identified application.

10. The method of claim 8, wherein the connection attempt between the client device and the destination server is terminated in response to detecting an aspect of a TLS server hello message sent by the destination server to the client device through the tunnel gateway.

11. The method of claim 10, wherein the connection attempt is terminated in response to a cipher suite specified by the TLS server hello message comprising an unapproved cipher suite, wherein at least one approved cipher suite is associated with the application in the tunnel gateway.

12. The method of claim 8, further comprising identifying a pinned certificate associated with the destination server in the tunnel gateway, wherein the connection attempt is terminated in response to a certificate provided by the destination server being different from the pinned certificate.

13. The method of claim 12, wherein the connection attempt is terminated in response to the certificate provided by the destination server being signed by an unapproved certificate authority.

14. The method of claim 8, further comprising causing a push notification to be transmitted to the client device in response to terminating the connection attempt, the push notification comprising a message indicating that the connection attempt has been terminated.

15. The method of claim 8, further comprising causing a push notification to be transmitted to the client device in response to terminating the connection attempt, the push notification comprising a message indicating that the connection attempt has been terminated.

16. A non-transitory computer-readable medium comprising executable instructions implementing a tunnel gateway, the instructions, when executed, causing at least one computing device to at least:

obtain a transport layer security (TLS) client hello message according to a TLS handshake over a virtual private network (VPN) tunnel established between a client device and the tunnel gateway, the TLS client hello message comprising a connection attempt between a destination server and the client device;

identify an aspect of the connection attempt based upon the TLS handshake, wherein the TLS client hello message originates from an application installed on the client device and is routed to the tunnel gateway using a per-application VPN capability of an operating system of the client device that causes all network traffic from the application to be routed to the tunnel gateway;

identify the application based upon data embedded into the TLS client hello message by the per-application VPN capability;

identify a TLS policy corresponding to the application; and terminate the connection attempt between the client device and the destination server in response to determining that the aspect of the TLS handshake violates the TLS policy.

17. The non-transitory computer readable medium of claim 16, wherein the connection attempt between the client device and the destination server is terminated by the tunnel gateway in response to a server name indication (SNI) or a TLS version specified by the TLS client hello message comprising an unapproved value for the identified application.

18. The non-transitory computer readable medium of claim 16, wherein the connection attempt between the client device and the destination server is terminated in response to detecting an aspect of a TLS server hello message sent by the destination server to the client device through the tunnel gateway.

19. The non-transitory computer readable medium of claim 16, wherein the tunnel gateway causes the at least one computing device to identify a pinned certificate associated with the destination server in the tunnel gateway, and the tunnel gateway terminates the connection attempt in response to a certificate provided by the destination server being different from the pinned certificate.

20. The non-transitory computer readable medium of claim 16, wherein the tunnel gateway causes the at least one computing device to at least cause a push notification to be transmitted to the client device in response to terminating the connection attempt, the push notification comprising a message indicating that the connection attempt has been terminated.

\* \* \* \* \*